US011316408B2

(12) United States Patent
Hibino et al.

(10) Patent No.: US 11,316,408 B2
(45) Date of Patent: Apr. 26, 2022

(54) COOLING APPARATUS FOR ELECTRIC MOTOR

(71) Applicant: TOYOTA JIDOSHA KABUSHIKI KAISHA, Aichi-ken (JP)

(72) Inventors: Akira Hibino, Susono (JP); Fumiki Tanahashi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/103,956

(22) Filed: Nov. 25, 2020

(65) Prior Publication Data

US 2021/0234435 A1 Jul. 29, 2021

(30) Foreign Application Priority Data

Jan. 24, 2020 (JP) .............................. JP2020-010175

(51) Int. Cl.
*H02K 9/193* (2006.01)
*H02K 7/00* (2006.01)
*H02K 5/124* (2006.01)

(52) U.S. Cl.
CPC .............. *H02K 9/193* (2013.01); *H02K 5/124* (2013.01); *H02K 7/003* (2013.01)

(58) Field of Classification Search
CPC ......... H02K 9/193; H02K 5/124; H02K 7/003
USPC .................. 310/52, 54, 60 A, 75 R, 75 D, 99
See application file for complete search history.

(56) References Cited

U.S. PATENT DOCUMENTS

2011/0207570 A1* 8/2011 Tanaka .................... B60K 1/00
  475/150
2013/0274052 A1* 10/2013 Kalmbach ............... B60K 1/00
  475/150
2016/0036297 A1* 2/2016 Rues ........................ H02K 5/20
  310/54

FOREIGN PATENT DOCUMENTS

DE     10018329 A1 * 11/2000 ............. F16H 48/22
JP     2018100705 A  * 6/2018
JP     2019143667 A    8/2019
WO  WO-2018207557 A1 * 11/2018 ............. F16H 57/04

* cited by examiner

*Primary Examiner* — Jose A Gonzalez Quinones
(74) *Attorney, Agent, or Firm* — Hauptman Ham, LLP (57) ABSTRACT

The cooling apparatus uses oil to cool an electric motor whose output is transmitted to a drive shaft inserted into a motor shaft via a reduction gear and a differential gear. An oil seal seals the gap between the differential case of the differential gear and the outer peripheral surface of the drive shaft. An oil passage is formed inside the drive shaft. An oil introduction hole is formed in the drive shaft on the side of the differential gear with respect to the oil seal to introduce oil from the differential gear into the in-drive-shaft oil passage. An oil outlet hole is formed in the drive shaft on the side of the electric motor with respect to the oil seal to draw oil from the in-drive-shaft oil passage to the inside of the motor shaft.

7 Claims, 6 Drawing Sheets

COOLING APPARATUS FOR ELECTRIC MOTOR

CROSS-REFERENCE TO RELATED APPLICATION

The present application claims priority under 35 U.S.C. § 119 to Japanese Patent Application No. 2020-010175, filed Jan. 24, 2020. The contents of this application are incorporated herein by reference in their entirety.

BACKGROUND

Field

The present disclosure relates to a cooling apparatus for an electric motor, and more particularly to a cooling apparatus for cooling an electric motor whose output is transmitted to a drive shaft inserted into a motor shaft via a reduction gear and a differential gear by oil.

Background Art

A drive unit is known in which an electric motor is integrated with a reduction gear and a differential gear. The electric motor is positioned coaxially with a drive shaft, and the drive shaft is passed through the interior of a motor shaft. In such a drive unit, the oil used to lubricate the reduction gear or the differential gear can be used to cool the electric motor.

An example of a conventional technique relating to the supply of oil to the electric motor is described in JP2019-143667A. In the prior art described in JP2019-143667A, an oil passage for guiding the oil in the reduction gear to the outer peripheral surface of the drive shaft is formed in a partition member for partitioning the reduction gear and the differential gear. The drive shaft penetrates the partition member, and the tip end of the motor shaft is slightly engaged with the partition member. The oil introduced from the oil passage to the outer peripheral surface of the drive shaft flows through the gap between the drive shaft and the motor shaft, and is supplied to the inside of the motor from a hole formed in the motor shaft. Incidentally, an oil seal for preventing the inflow of oil to the differential gear is provided between the partition member and the drive shaft, on the side of the differential gear with respect to the oil passage. Another oil seal is provided between the partition member and the tip of the motor shaft to prevent oil from flowing out from the oil passage.

Supplying oil from the inside of the motor shaft as in the prior art has advantages in space efficiency relating to the arrangement of the oil passage for supplying oil to the electric motor. However, while the rotation speed of the drive shaft is about 1,000 rpm, the rotation speed of the electric motor is 10,000 rpm or more. Therefore, in the prior art, the oil seal between the partition member and the motor shaft will be subject to a very large peripheral speed difference. If the peripheral speed difference is large, the frictional resistance in the oil seal increases, and the driving loss of the electric motor increases. The increase of the driving loss reduces the efficiency of the vehicle as a whole.

SUMMARY

The present disclosure has been made in view of the above problems related to the cooling apparatus for cooling the electric motor whose output is transmitted to the drive shaft inserted into the motor shaft via the reduction gear and the differential gear by oil, and an object of the present disclosure is to improve the space efficiency related to the arrangement of the oil passage for supplying oil to the electric motor, and to reduce the driving loss of the electric motor.

The cooling apparatus according to the present disclosure is a cooling apparatus for an electric motor whose output is transmitted to a drive shaft inserted into a motor shaft via a reduction gear and a differential gear. The cooling apparatus according to the present disclosure comprises an oil seal for sealing the gap between the differential case of the differential gear and then outer peripheral surface of the drive shaft, an in-drive-shaft oil passage formed inside the drive shaft, an oil introducing hole for introducing oil from the differential gear to the in-drive-shaft oil passage, and an oil outlet hole for drawing oil from the in-drive-shaft oil passage to the inside of the motor shaft. The oil introduction hole is formed in the drive shaft on the side of the differential gear with respect to the oil seal. The oil outlet hole is formed in the drive shaft on the side of the electric motor with respect to the oil seal.

According to the cooling apparatus according to the present disclosure, the oil for cooling the electric motor is supplied from the differential gear to the inside of the motor shaft through the in-drive-shaft oil passage. The provision of the oil passage in the drive shaft provides excellent space efficiency in the arrangement of the oil passage. Also, since the oil passage is provided in the drive shaft, the oil seal can be installed between the differential case of the differential gear and the outer peripheral surface of the drive shaft. Therefore, the peripheral speed difference received by the oil seal during operation is suppressed, and the driving loss of the electric motor is reduced.

In one embodiment of the cooling apparatus according to the present disclosure, the oil introduction hole may open on the end face of the drive shaft inserted into the differential case of the differential gear. In this case, the oil in the differential gear is introduced from the oil introduction hole on the end face of the drive shaft to the in-drive-shaft oil passage.

If the tip of the drive shaft extends to a pinion shaft of the differential gear, a guide groove may be formed on the end face of the drive shaft to guide oil to the oil introduction hole. According to such a configuration, in the gap between the end face of the drive shaft and the peripheral surface of the pinion shaft, oil is collected in the oil introduction hole by the guide groove formed on the end face.

Also, if the tip of the drive shaft extends to the pinion shaft of the differential, an oil supply hole may be formed in the pinion shaft to supply oil to the oil introduction hole. According to such a configuration, in the gap between the end surface of the drive shaft and the peripheral surface of the pinion shaft, oil is supplied from the oil supply hole of the pinion shaft to the in-drive-shaft oil passage.

Further, if the tip of an opposite drive shaft facing the drive shaft across the differential gear extends to the pinion shaft of the differential gear, an oil supply path may be formed inside the opposite drive shaft to supply oil to the differential gear. The oil supply hole formed in the pinion shaft communicates the in-drive-shaft oil passage of the drive shaft and the oil supply passage of the opposite drive shaft. According to such a configuration, oil is supplied from the opposite drive shaft to the in-drive-shaft oil passage of the drive shaft through the oil supply hole of the pinion shaft.

In another embodiment of the cooling apparatus according to the present disclosure, the drive shaft may include a core member having a circumferential surface formed with a groove extending in an axial direction, and a cylindrical member to be fitted to the circumferential surface of the core member. The groove on the peripheral surface of the core member is covered by the cylindrical member, whereby the in-drive-shaft oil passage extending in the axial direction is formed near the surface layer of the drive shaft.

The groove formed in the core member may have an open portion which is not covered with the cylindrical member. The open portion located on the side of the differential gear with respect to the oil seal becomes the oil introduction hole, and the open portion located on the side of the electric motor with respect to the oil seal becomes the oil outlet hole. According to such a configuration, the oil introduced from the differential gear flows near the surface layer of the drive shaft, and is supplied to the inside of the motor shaft.

As described above, according to the cooling apparatus according to the present disclosure, the oil passage for supplying oil to the electric motor is provided in the drive shaft, whereby excellent space efficiency is realized in the arrangement of the oil passage. Further, according to the cooling apparatus according to the present disclosure, the oil seal can be installed between the differential case of the differential gear and the outer peripheral surface of the drive shaft, whereby the peripheral speed difference received by the oil seal during operation is suppressed, and the driving loss of the electric motor is reduced.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly specified by the numerals theoretically. Furthermore, structures and steps that are described in the embodiments shown as follows are not always indispensable to the disclosure unless specially explicitly shown otherwise, or unless the disclosure is explicitly specified by the structures or the steps theoretically.

First Embodiment

A cooling apparatus of an electric motor according to the first embodiment will be described with reference to FIG. 1.

Figure 1:
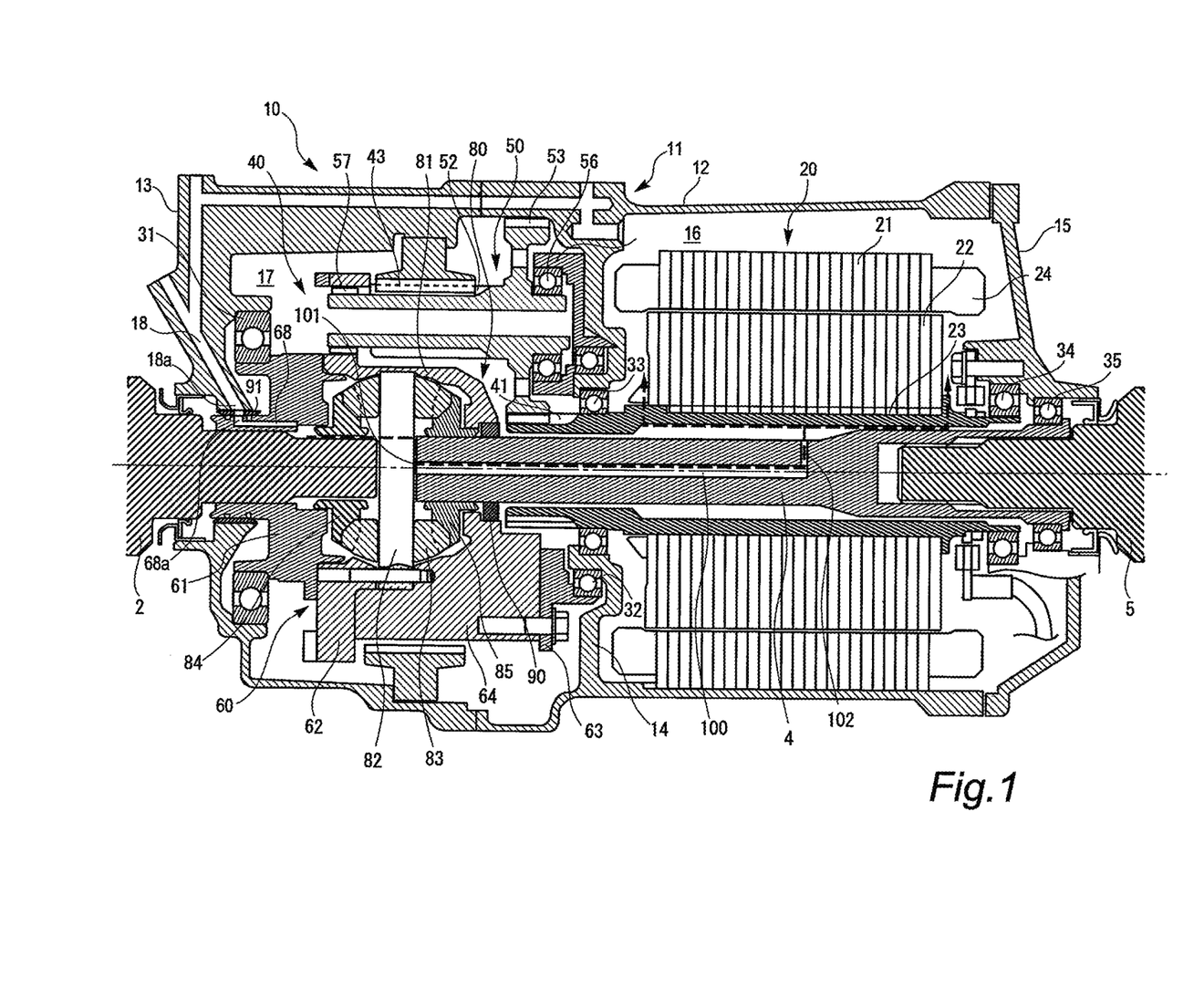
FIG. 1 is a longitudinal sectional view showing a structure of a drive unit to which a cooling apparatus of an electric motor according to a first embodiment of the present disclosure is applied.

FIG. 1 is a longitudinal sectional view showing a structure of a drive unit to which the cooling apparatus of the electric motor according to the first embodiment is applied.

A drive unit 10 is an apparatus in which a reduction gear 40 and a differential gear 80 is integrated with an electric motor 20. Torque output by the electric motor 20 is increased by the reduction gear 40, and is divided into left and right by the differential gear 80 to transmit to a left drive shaft 2 and a right drive shaft 5. The left drive shaft 2 and the right drive shaft 5 are connected to the drive unit 10 from the outside. An inner drive shaft 4 coupled with the right drive shaft 5 is accommodated in the drive unit 10. The left drive shaft 2 is connected directly to the differential gear 80, and the right drive shaft 5 is connected to the differential gear 80 via the inner drive shaft 4. Note that left and right in this specification mean left and right on the drawing, and do not mean actual left and right positions on the vehicle.

The electric motor 20 is accommodated in a transaxle case 11 fixed to a vehicle body (not shown). The electric motor 20 includes a stator 21 including a coil 24, a rotor 22 which is rotatable with respect to the stator 21, and a motor shaft 23 which is integrated with the rotor 22. The stator 21 is fixed to the transaxle case 11. The motor shaft 23 is cylindrical, and the inner drive shaft 4 is inserted into the motor shaft 23. However, the motor shaft 23 and the inner drive shaft 4 are in non-contact, and the motor shaft 23 is rotatable with respect to the inner drive shaft 4.

The transaxle case 11 is a three-division type case including a cylindrical case 12 for accommodating the inner drive shaft 4, a bottomed cylindrical case 13 fixed to the cylindrical case 12 so as to close the opening of the cylindrical case 12 on the side of the left drive shaft 2, and a disc-shaped case cover 15 fixed to the cylindrical case 12 so as to close the opening of the cylindrical case 12 on the side of the right drive shaft 5. A partition wall 14 for dividing the cylindrical case 12 into two is provided inside the cylindrical case 12. By the partition wall 14, the interior of the transaxle case 11 is partitioned into a motor chamber 16 which is a space from the partition wall 14 to the case cover 15 and a gear chamber 17 which is a space from the partition wall 14 to the bottomed cylindrical case 13.

The motor chamber 16 accommodates the electric motor 20. Through holes are opened in the partition wall 14 and the case cover 15 which constitute the motor chamber 16. The through hole of the partition wall 14 is provide with a ball bearing 33 for rotatably supporting the motor shaft 23. The through hole of the case cover 15 is provided with a ball bearing 34 for rotatably supporting the motor shaft 23 and a ball bearing 35 for rotatably supporting the inner drive shaft 4. A sun gear 41 constituting the reduction gear 40 is formed at the tip of the motor shaft 23 protruding from the motor chamber 16 into the gear chamber 17 through the partition wall 14.

The gear chamber 17 accommodates the reduction gear 40 and the differential gear 80. The reduction gear 40 is a planetary gear reduction mechanism having the sun gear 41 as an input element, a ring gear 43 as a reaction force element, and a carrier 60 as an output element. The ring gear 43 is fixed to the inside of the bottomed cylindrical case 13. The ring gear 43 is provided on the side closer to the left drive shaft 2 than the sun gear 41, that is, on the side farther from the partition wall 14. A stepped pinion 50 which meshes with each of the sun gear 41 and the ring gear 43 is rotatably supported on the carrier 60. Although only one stepped pinion 50 is drawn in FIG. 1, the number of the stepped pinions 50 provided in the reduction gear 40 is a plurality (e.g., three), and the stepped pinions 50 are arranged at equal intervals in the circumferential direction.

The stepped pinion 50 has a structure in which a small-diameter pinion 52 and a large-diameter pinion 53 are integrated with a pinion shaft. The large-diameter pinion 53 is engaged with the sun gear 41, and the small-diameter pinion 52 is engaged with the ring gear 43. A ball bearing 56 and a needle bearing 57 are used to support the stepped pinion 50 by the carrier 60. The ball bearing 56 is fitted to the outer shaft surface of the large diameter pinion 53. The needle roller bearing 57 is fitted to the outer shaft surface of the small diameter pinion 52.

The carrier 60 includes a first divided body 61, a second divided body 62, and a third divided body 63 which are divided into three in the axial direction of the drive shafts 2 and 4. The first divided body 61 located on the side of the left drive shaft 2 is rotatably supported by a ball bearing 31 at the bottom of the bottomed cylindrical case 13. The bottomed cylindrical case 13 has a through hole, and a sleeve which is rotatably supported in the through hole is formed on the first divided body 61. The tip of the left drive shaft 2 extends through the sleeve of the first divided body 61.

The second divided body 62 is coupled to the first divided body 61 by bolts. The needle bearing 57 supporting the stepped pinion 50 is attached to the second divided body 62. The second divided body 62 is bulged in a dome shape from the first divided body 61 toward the inner drive shaft 4, and the dome-shaped portion of the second divided body 62 also serves as a differential case 81 of the differential gear 80. An opening is provided at the top of the dome-shaped bulged differential case 81, and the tip of the inner drive shaft 4 enters to the inside of the differential case 81 from the opening. Between the differential case 81 and the outer peripheral surface of the inner drive shaft 4, an oil seal 90 for preventing the leakage of oil from the differential case 81 is provided.

The third divided body 63 located on the side of the inner drive shaft 4 is rotatably supported by the partition wall 14 via a ball bearing 32. The third divided body 63 is an annular component through which the motor shaft 23 and the inner drive shaft 4 pass. The ball bearing 56 supporting the stepped pinion 50 is attached to the third divided body 63. The third divided body 63 is connected to the second divided body 62 by a plurality of supports 64. The supports 64 are erected the same number as the installation number of the stepped pinions 50 (e.g., three) at regular intervals in the circumferential direction, and are coupled with the third divided body 63 by bolts.

The carrier 60 formed by combining the above three divided bodies 61, 62 and 63 are rotatably supported at both ends in the axial direction via ball bearings 31 and 32 by the bottom of the bottomed cylindrical case 13 and the partition wall 14. Torque output by the electric motor 20 is input from the sun gear 41 provided at the tip of the motor shaft 23 to the stepped pinion 50, and is input to the ring gear 43 from the stepped pinion 50. Since the ring gear 43 is fixed, a reaction force acts on the stepped pinion 50 from the ring gear 43 to rotate the carrier 60 supporting the stepped pinion 50 in the same direction as the motor shaft 23.

The differential gear 80 includes a left differential side gear 84 fixed to the tip of the left drive shaft 2, a right differential side gear 85 fixed to the tip of the inner drive shaft 4, and a differential pinion 83 meshing with both. The differential pinion 83 and the left and right differential side gears 84 and 85 are accommodated in the differential case 81. The left differential side gear 84 and the right differential side gear 85 are positioned coaxially facing each other, and a pinion shaft 82 is passed in the radial direction between them. The tip of the inner drive shaft 4 and the tip of the left drive shaft 2 are close to the peripheral surface of the pinion shaft 82. The pinion shaft 82 is fixed to the differential case 81. A pair of opposing differential pinions 83 are rotatably supported on the pinion shaft 82. When the carrier 60 rotates, the differential case 81 integral with the carrier 60 rotates together with the differential pinion 83, and the left and right differential side gears 84 and 85 are driven by the differential pinion 83 to rotate the left drive shaft 2 and the inner drive shaft 4.

In the drive unit 10, oil for lubrication is supplied to the necessary portion of the reduction gear 40 and the differential gear 80. Then, the oil is also used to cool the electric motor 20. Hereinafter, a configuration of a cooling apparatus for cooling the electric motor 20 by oil. Incidentally, the locus drawn by the arrow lines in FIG. 1 schematically shows the flow of oil for cooling the electric motor 20 in the driving device 10.

An in-case oil passage 18 through which oil flows is formed in the transaxle case 11. The in-case oil passage 18 formed in the bottomed cylindrical case 13 extends to the contact surface between the bottomed cylindrical case 13 and the sleeve of the first divided body 61, and has an oil outlet 18a which opens at the contact surface. The first divided body 61 has an oil inlet 68a which opens at a position corresponding to the oil outlet 18a. An in-carrier oil passage 68 is formed in the first divided body 61. The in-carrier oil passage 68 communicates with the oil inlet 68a, and extends to the inside of the differential case 81.

The oil outlet 18a of the in-case oil passage 18 and the oil inlet 68a of the in-carrier oil passage 68 repeats communicating and departing when the carrier 60 rotates. When the oil inlet 68a is communicated with the oil outlet 18a, the oil is pumped from the in-case oil passage 18 to the in-carrier oil passage 68 by the hydraulic pressure applied to the oil, and the oil is supplied from the in-carrier oil passage 68 to the inside of the differential case 81. Incidentally, an oil seal 91 for preventing oil leakage to the outside of the transaxle case 11 is provided on the contact surface between the bottomed cylindrical case 13 and the sleeve of the first divided body 61.

Figure 2:
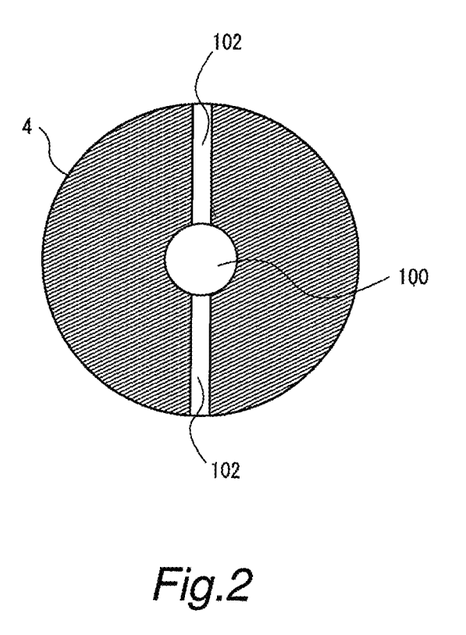
FIG. 2 is a cross-sectional view of an inner drive shaft in the drive unit shown in FIG. 1.

An oil introduction hole 101 is provided on the end face of the tip of the inner drive shaft 4 inserted into the differential case 81. The oil introduction hole 101 communicates with an in-drive-shaft oil passage 100 formed inside the inner drive shaft 4. The in-drive-shaft oil passage 100 passes through the axis of the inner drive shaft 4. The inner drive shaft 4 is provided with an oil outlet hole 102 which opens to the peripheral surface thereof and communicates with the in-drive-shaft oil passage 100. The oil outlet hole 102 is located inside the motor shaft 23. Although the oil outlet hole 102 is opened in one direction from the in-drive-shaft oil passage 100 in FIG. 1, as shown in the cross-sectional view of FIG. 2, it may be opened in a plurality of directions from the in-drive-shaft oil passage 100.

The oil in the differential case 81 is introduced into the in-drive-shaft oil passage 100 from the oil introduction hole 101 in the gap between the peripheral surface of the pinion shaft 82 and the end surface of the inner drive shaft 4. Since the gap between the differential case 81 and the outer peripheral surface of the inner drive shaft 4 is sealed by the oil seal 90, leakage of oil from the differential case 81 is suppressed. Then, the oil introduced into the in-drive-shaft oil passage 100 is drawn from the oil outlet hole 102 to the inside of the motor shaft 23. A plurality of holes (not shown)

for communicating the inner and outer of the motor shaft 23 are provided on the peripheral surface of the motor shaft 23. The oil drawn to the inside of the motor shaft 23 cools the motor shaft 23. A part of the oil flows out of the motor shaft 23 through the hole on the peripheral surface, and cools the rotor 22 and the stator 21, in particular, the coil 24 which is a heat generating portion.

According to the cooling apparatus having the above configuration, the oil for cooling the electric motor 20 is supplied from the differential gear 80 to the inside of the motor shaft 23 through the in-drive-shaft oil passage 100. The oil passage 100 is provided inside the inner drive shaft 4 rather than in the motor chamber 16, whereby excellent space efficiency is realized related to the arrangement of the oil passage for cooling the electric motor 20. Further, since the oil passage 100 is provided inside the inner drive shaft 4, and the oil introduction hole 101 is provided on the end face of the tip of the inner drive shaft 4, the oil seal 90 can be installed between the differential case 81 of the differential gear 80 and the outer peripheral surface of the inner drive shaft 4. Therefore, as compared with the case of sealing with the motor shaft 23, the peripheral speed difference received by the oil seal 90 during operation is suppressed, and the drive loss of the electric motor 20 is reduced.

Figure 3:
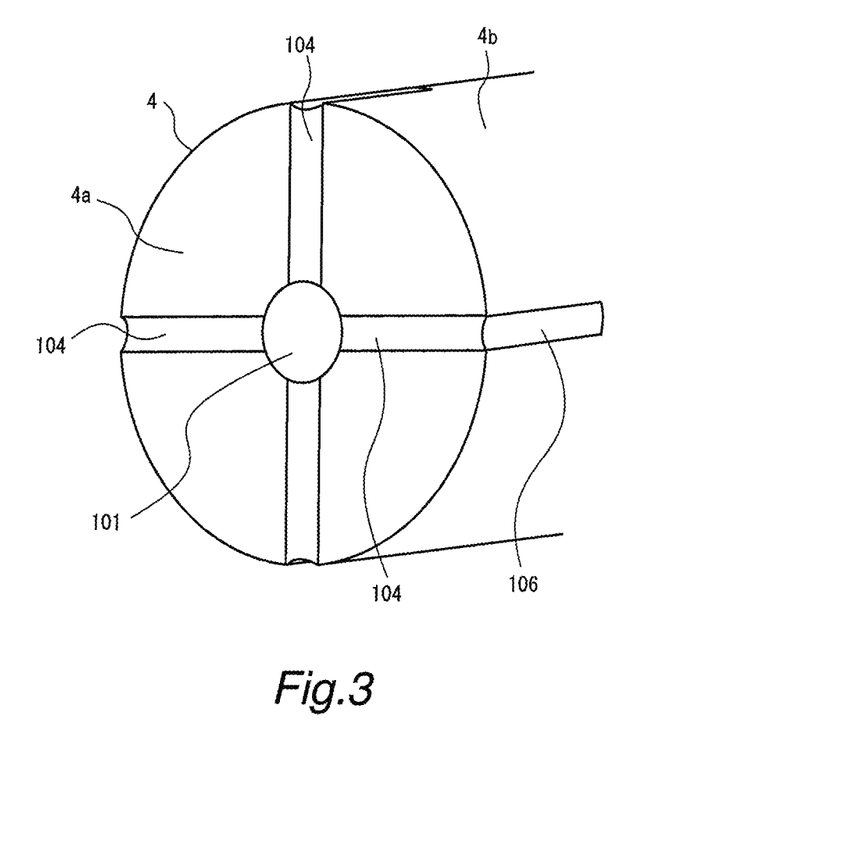
FIG. 3 is a perspective view showing a modification of a shape of the end face of the inner drive shaft in the drive unit shown in FIG. 1.

The cooling apparatus according to the present embodiment can be variously modified. FIG. 3 is a perspective view showing a modification of the shape of the end face 4a of the inner drive shaft 4 in the drive unit 10 shown in FIG. 1. In this modification, a guide groove 104 for guiding oil to the oil introduction hole 101 is formed on the end surface 4a of the inner drive shaft 4. Further, a groove 106 which is continuous with the guide groove 104 is formed on the circumferential surface 4b of the inner drive shaft 4.

According to such a configuration, oil is collected in the oil introduction hole 101 by the guide groove 104 formed on the end face 4a in the gap between the end face 4a of the inner drive shaft 4 and the peripheral surface of the pinion shaft 82. Although the guide groove 104 shown in FIG. 3 has a cross shape, the shape of the guide groove 104 is not limited to the cross shape as long as it is formed so as to be connected to the oil introduction hole 101.

Figure 4:
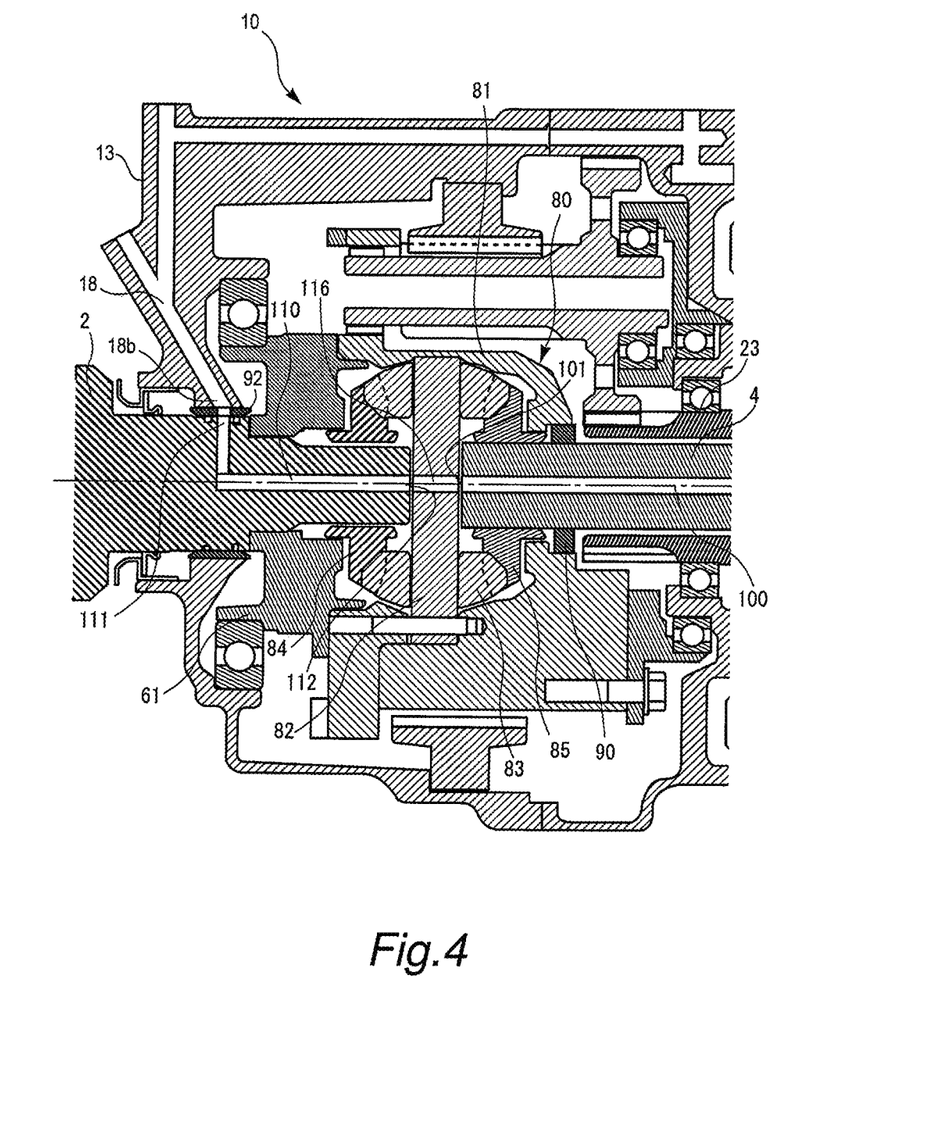
FIG. 4 is a longitudinal sectional view showing a modification of a configuration of a system supplying oil to an in-drive-shaft oil passage of the inner drive shaft in the drive unit shown in FIG. 1.

FIG. 4 is a longitudinal sectional view showing a modification of the configuration of the system supplying oil to the in-drive-shaft oil passage 100 of in the drive unit 10 shown in FIG. 1. In this modification, the circumferential surface of the left drive shaft 2 is in contact with a through hole opened in the bottomed cylindrical case 13. The in-case oil passage 18 formed in the bottomed cylindrical case 13 extends to the contact surface between the bottomed cylindrical case 13 and the left drive shaft 2, and has an oil outlet 18b which opens at the contact surface. An oil seal 92 is provided on the contact surface between the bottomed cylindrical case 13 and the left drive shaft 2 to prevent oil leakage to the outside of the transaxle case 11.

The left drive shaft 2 has an oil introduction hole 111 formed at the position corresponding to the oil outlet 18b. The oil introduction hole 111 communicates with an oil supply passage 110 formed inside the left drive shaft 2. The oil supply passage 110 extends through the axis of the left drive shaft 2 to the end face. The tip of the left drive shaft 2 extends to the pinion shaft 82, and an oil outlet hole 112 in communication with the oil supply passage 110 is formed on the end face of the left drive shaft 2. The pinion shaft 82 is formed with an oil supply hole 116 penetrating from the side of the left drive shaft 2 to the side of the inner drive shaft 4. The oil supply hole 116 communicates the oil outlet hole 112 in the left drive shaft 2 with the oil introduction hole 101 in the inner drive shaft 4.

According to such a configuration, oil for lubrication of the differential gear 80 is fed through the interior of the left drive shaft 2 into the differential case 81. Then, oil for cooling the electric motor 20 is supplied from the oil supply passage 110 of the left drive shaft 2 to the in-drive-shaft oil passage 100 of the inner drive shaft 4 through the oil supply hole 116 of the pinion shaft 82.

Second Embodiment

Figure 5:
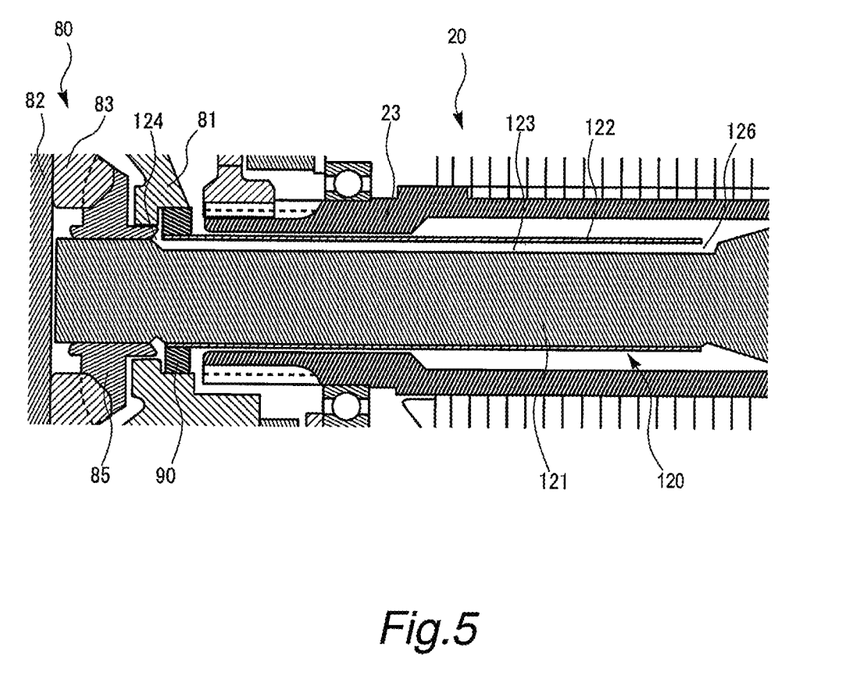
FIG. 5 is a longitudinal sectional view showing a structure of an inner drive shaft of a drive unit to which a cooling apparatus of an electric motor according to a second embodiment of the present disclosure is applied.
Figure 6:
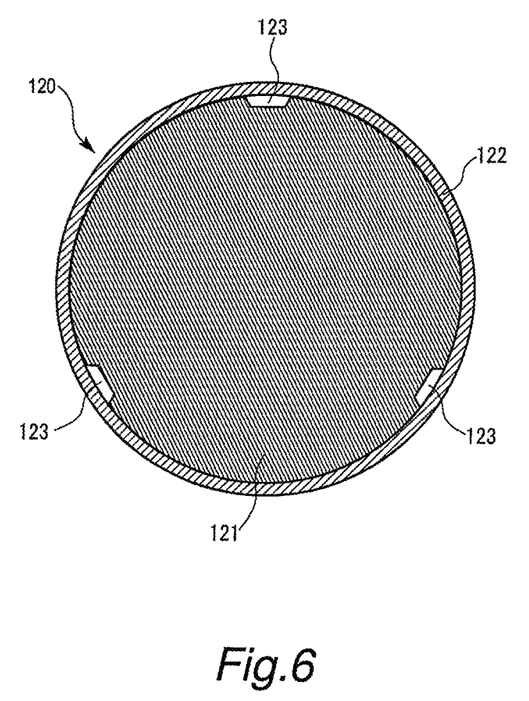
FIG. 6 is a cross-sectional view of the inner drive shaft in the drive unit shown in FIG. 5.

Next, the cooling apparatus of the electric motor according to the second embodiment will be described with reference to FIGS. 5 and 6. FIG. 5 is a longitudinal sectional view showing the structure of the inner drive shaft of the drive unit to which the cooling apparatus of the electric motor according to the second embodiment is applied. FIG. 6 is a cross-sectional view of the inner drive shaft shown in FIG. 5. There is a difference in the configuration of the in-drive-shaft oil passage formed inside the inner drive shaft between the second embodiment and the first embodiment.

In the second embodiment, an inner drive shaft 120 includes a core member 121, and a cylindrical member 122 to be fitted with the peripheral surface of the core member 121. A plurality of grooves 123 extending in the axial direction are formed on the peripheral surface of the core member 121. In the example shown in FIG. 6, three grooves 123 are formed at equal intervals. The cylindrical member 122 is a steel pipe having a thickness of about 0.5 mm, and is press-fitted to the core member 121. The groove 123 has, for example, a width of about 2 mm and a depth of about 2 mm. By press-fitting the cylindrical member 122 to the core member 121, the groove 123 of the peripheral surface of the core member 121 is covered by the inner peripheral surface of the cylindrical member 122. That is, in the second embodiment, the in-drive-shaft oil passage extending in the axial direction of the inner drive shaft 120 is configured with the groove 123 and the inner peripheral surface of the cylindrical member 122.

The front end portion and the rear end portion of the groove 123 in the axial direction have open portions 124 and 126 which are not covered by the cylindrical member 122, respectively. The oil seal 90 for sealing the gap between the differential case 81 and the outer peripheral surface of the inner drive shaft 120 is in contact with the front end portion of the cylindrical member 122. An open portion 124 located on the side of the differential gear 80 with respect to the oil seal 90 provides an oil introduction hole for introducing oil from the differential gear 80 into the in-drive-shaft oil passage. Further, an open portion 126 located on the side of the electric motor 20 with respect to the oil seal 90 provides an oil outlet hole for drawing oil from the in-drive-shaft oil passage to the inside of the motor shaft 23. In the second embodiment, the oil introduced from the differential gear 80 flows near the surface layer of the inner drive shaft 120, and is fed into the motor shaft 23.

What is claimed is:

1. A cooling apparatus for an electric motor whose output is transmitted to a drive shaft inserted into a motor shaft via a reduction gear and a differential gear, the cooling apparatus comprising:
   an oil seal for sealing a gap between a differential case of the differential gear and an outer peripheral surface of the drive shaft;
   an in-drive-shaft oil passage formed inside the drive shaft;

an oil introduction hole formed in the drive shaft on a side of the differential gear with respect to the oil seal to introduce oil from the differential gear to the in-drive-shaft oil passage; and an oil outlet hole formed in the drive shaft on a side of the electric motor with respect to the oil seal to draw oil from the in-drive-shaft oil passage to an inside of the motor shaft.

2. The cooling apparatus for an electric motor according to claim 1, wherein the oil introduction hole opens on an end face of the drive shaft inserted into the differential case.

3. The cooling apparatus for an electric motor according to claim 2, wherein a tip of the drive shaft extends to a pinion shaft of the differential gear, and a guide groove for guiding oil to the oil introduction hole is formed on the end face of the drive shaft.

4. The cooling apparatus for an electric motor according to claim 2, wherein a tip of the drive shaft extends to a pinion shaft of the differential gear, and an oil supply hole for supplying oil to the oil introduction hole is formed in the pinion shaft.

5. The cooling apparatus for an electric motor according to claim 4, wherein a tip of an opposite drive shaft facing the drive shaft across the differential gear extends to the pinion shaft, an oil supply passage for supplying oil to the differential gear is formed inside the opposite drive shaft, and the oil supply hole communicates the oil supply passage with the in-drive-shaft oil passage.

6. The cooling apparatus for an electric motor according to claim 4, wherein the drive shaft includes a core member having a circumferential surface formed with a groove extending in an axial direction, and a cylindrical member fitted to the circumferential surface of the core member, and the groove is covered by the cylindrical member to form the in-drive-shaft oil passage.

7. The cooling apparatus for an electric motor according to claim 6, wherein the groove has an open portion which is not covered by the cylindrical member, the oil introduction hole is the open portion located on a side of the differential gear with respect to the oil seal, and the oil outlet hole is the open portion located on a side of the electric motor with respect to the oil seal.

* * * * *